(12) United States Patent
Tasser

(10) Patent No.: US 12,093,062 B2
(45) Date of Patent: Sep. 17, 2024

(54) PRESSURE REDUCER

(71) Applicant: PITTWAY SARL, Rolle (CH)

(72) Inventor: Peter Tasser, Eberbach (DE)

(73) Assignee: PITTWAY SARL, Rolle (CH)

( * ) Notice: Subject to any disclaimer, the term of this patent is extended or adjusted under 35 U.S.C. 154(b) by 36 days.

(21) Appl. No.: 17/906,154

(22) PCT Filed: Mar. 10, 2021

(86) PCT No.: PCT/EP2021/056079
§ 371 (c)(1),
(2) Date: Sep. 12, 2022

(87) PCT Pub. No.: WO2021/180802
PCT Pub. Date: Sep. 16, 2021

(65) Prior Publication Data
US 2023/0176596 A1   Jun. 8, 2023

(30) Foreign Application Priority Data
Mar. 13, 2020 (DE) ............. 10 2020 107 027.6

(51) Int. Cl.
*G05D 16/06* (2006.01)
*G01M 3/28* (2006.01)

(52) U.S. Cl.
CPC ...... *G05D 16/0658* (2013.01); *G01M 3/2876* (2013.01)

(58) Field of Classification Search
CPC .......... Y10T 137/782; Y10T 137/7809; G05D 16/0658; G05D 16/0638; G05D 16/0655; G01M 3/2876
See application file for complete search history.

(56) References Cited

U.S. PATENT DOCUMENTS 6,637,452 B1 * 10/2003 Alman ............... F16K 3/243
251/324
8,607,818 B2   12/2013 Monroe et al.
(Continued)

FOREIGN PATENT DOCUMENTS

DE        19539239 C2    5/1998
DE    102009025441 A1 *  1/2011  ............. F16K 31/60
(Continued)

OTHER PUBLICATIONS

International Search Report (English Translation) in International Application No. PCT/EP2021/056079 mailed May 26, 2021.

*Primary Examiner* — Jessica Cahill
(74) *Attorney, Agent, or Firm* — Greenberg Traurig, LLP; David J. Dykeman; Ryan D. Sharp

(57) ABSTRACT

A pressure reducer includes a housing, defining upstream and downstream pressure chambers. A valve is positioned in the housing and includes a diaphragm acting on a valve tappet. The valve includes a valve body fastened to the valve tappet and cooperating with a sealing element. The valve body has a cylindrical, hollow-cylindrical, or conical contour and forms a sealing surface effective in the radial direction. The sealing surface is interrupted at at least one circumferential position by a flow channel, such that, depending on a pressure drop in the downstream pressure chamber, either the sealing element lies against the sealing surface and completely closes a flow region between the sealing element and the sealing surface or the sealing element is removed from the sealing surface and completely opens the flow region or the sealing element lies against the sealing surface and partly opens the flow region exclusively by the respective flow channel.

20 Claims, 3 Drawing Sheets

(56) References Cited

U.S. PATENT DOCUMENTS

Figure 1:
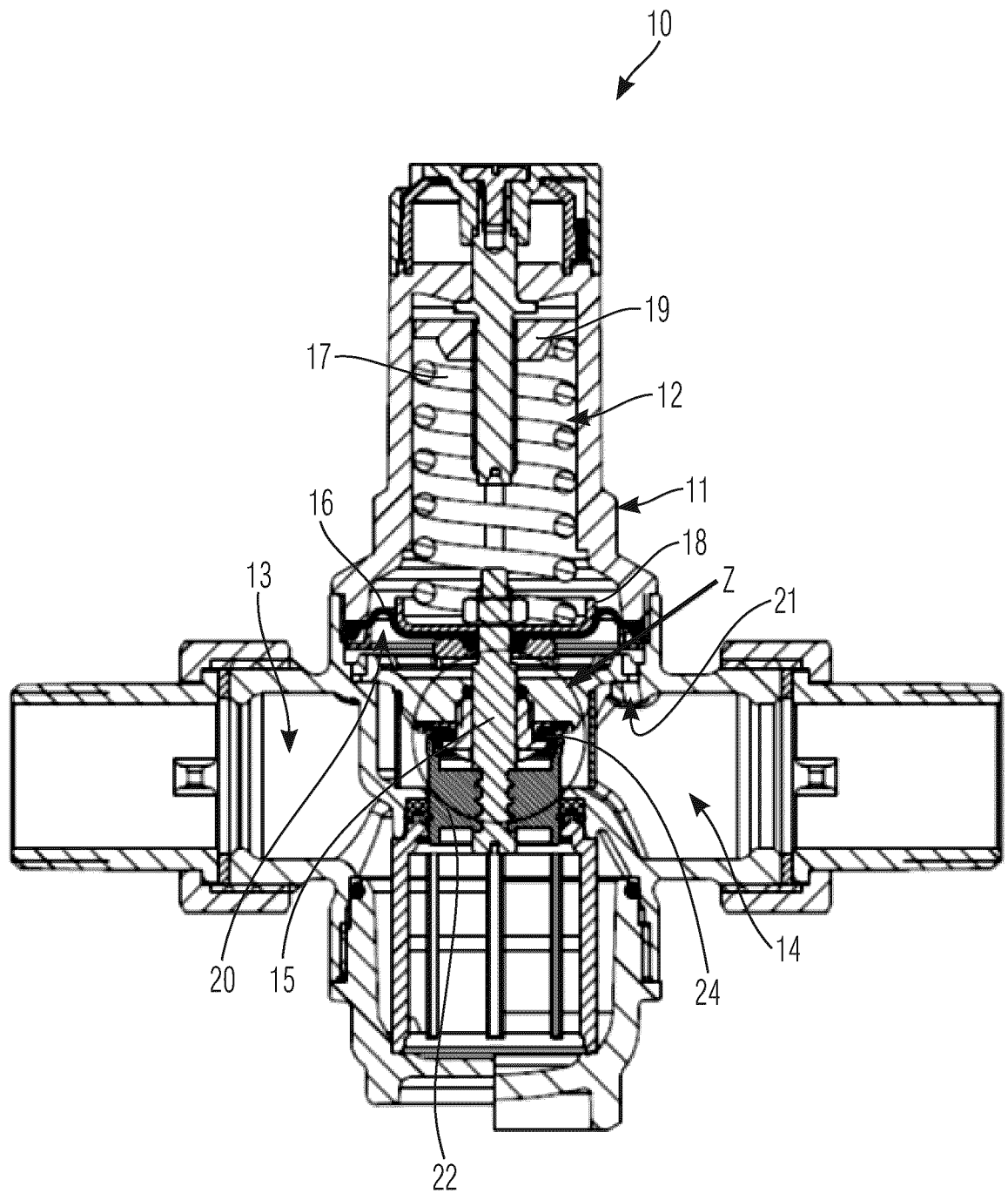

| | | | |
|---|---|---|---|
| 10,551,855 B2* | 2/2020 | Hart | G05D 16/0655 |
| 2011/0068284 A1* | 3/2011 | Jorgensen | F16K 3/26 |
| | | | 251/46 |
| 2013/0153058 A1* | 6/2013 | Hecking | F16K 17/00 |
| | | | 137/505 |

FOREIGN PATENT DOCUMENTS

| | | | | |
|---|---|---|---|---|
| DE | 102013216673 A1 | 2/2015 | | |
| DE | 102016122661 A1 | 5/2018 | | |
| DE | 102018205016 A1 | 10/2019 | | |
| EP | 1857905 A1 | 11/2007 | | |
| EP | 3239682 A1 | 11/2017 | | |
| GB | 2573875 B * | 1/2021 | | F16K 17/0453 |

\* cited by examiner

PRESSURE REDUCER

CROSS-REFERENCE TO RELATED APPLICATIONS

This application is a U.S. National Phase patent application under 35 U.S.C. 371 of International Application No. PCT/EP2021/056079 filed Mar. 10, 2021, which claims the benefit of and priority to German Patent Application No. 10 2020 107 027.6, filed on Mar. 13, 2020, each of which are incorporated herein by reference in their entireties.

The invention relates to a pressure reducer according to the preamble of claim 1.

Pressure reducers are primarily used in industrial plants and water supply systems of houses or buildings in order to provide a constant outlet pressure with fluctuating inlet pressure. A pressure reducer is preferably installed in a basement of a building or in a supply shaft so that there is no risk of the pressure reducer freezing. The necessity of providing a constant fluid pressure or water pressure does not only exist in industrial plants and water supply systems; rather, there are also other fields of application that must be supplied with a constant fluid pressure or water pressure. Pressure reducers installed outdoors are put out of operation in case of frost, for which purpose they are emptied.

A pressure reducer is known from DE 195 39 239 C2. This pressure reducer, which is known from the prior art, comprises a housing and a valve positioned in the housing, wherein the valve in its closed state separates an upstream pressure chamber of the housing from a downstream pressure chamber of the housing and in its open state connects the upstream pressure chamber and the downstream pressure chamber. The valve of the pressure reducer known from the prior art possesses a diaphragm acting on a valve tappet, on which diaphragm a spring force of a spring element directed in the opening direction of the valve acts on the one hand and a force dependent on a pressure in the downstream pressure chamber and directed in the closing direction of the valve acts on the other hand, thus providing a pressure-reducing function.

According to DE 195 39 239 C2 a valve body is fastened to the valve tappet and cooperates with a sealing element in such a way that, in the closed state of the valve, the valve body and the sealing element lie in sealing abutment to one another, and, in the opened state of the valve, the valve body is removed from the sealing element and opens the flow region between the valve body and the sealing element.

DE10 2018 205 016 A1 discloses a further pressure reducer.

DE 10 2016 122 661 A1 discloses a pressure reducing valve.

DE 10 2013 216 673 A1 discloses a storage chamber valve.

U.S. Pat. No. 8,607,818 B2 discloses a pressure relief valve.

In the case of a pressure reducer installed in a building or house, in particular, when there is a leakage in the water supply system downstream of the pressure reducer, the leakage can cause considerable damage. Thus far, it has been difficult to reliably detect such leakages which can form downstream of a pressure reducer.

An apparatus for detecting leakages in a water supply system is known from EP 3 239 682 A1. In this prior art, it is proposed to detect the movement of a tappet on the leakage detection apparatus with the aid of a sensor and to deduce the presence of a leakage depending on the movement of the tappet.

The problem with a pressure reducer is that small leakages cause only small movements of the valve tappet, the detection of which is difficult or only possible with great effort.

The underlying problem of the invention is to create a new kind of pressure reducer in which movements of the valve tappet caused by a leakage can be detected more easily or with less effort.

This problem is solved by a pressure reducer according to claim 1. According to the invention, the valve body fastened to the valve tappet has a cylindrical or hollow-cylindrical or conical contour, thus forming a sealing surface that is effective in the radial direction.

According to the invention, the sealing surface of the valve body fastened to the valve tappet is interrupted at at least one circumferential position by means of at least one flow channel in such a way that, depending on a pressure drop in the downstream pressure chamber, either the sealing element lies against the sealing surface, i.e., presses against the sealing surface when viewed in the radial direction, and completely closes a flow region between the sealing element and the sealing surface, including the respective flow channel, i.e., the at least one flow channel, or the sealing element is removed from the sealing surface and completely opens the flow region, including the respective flow channel, i.e., the at least one flow channel, or the sealing element lies against the sealing surface, i.e., presses against the sealing surface when viewed in the radial direction, and partly opens the flow region exclusively by means of the respective flow channel, i.e., the at least one flow channel.

The invention has the advantage that, when a leakage causes a relatively small change in pressure in the downstream pressure chamber, the valve tappet of the valve of the pressure reducer moves to a greater extent than in pressure reducers known from the prior art, so that a movement of the valve tappet caused by a leakage can be detected more easily or with less effort.

When the downstream pressure chamber experiences no pressure drop or a pressure drop that is less than a lower limit value, the sealing element lies against the sealing surface and completely closes the flow region between the sealing element and the sealing surface, including the respective flow channel, i.e., the at least one flow channel.

When the downstream pressure chamber experiences a pressure drop that is greater than an upper limit value, the sealing element is removed from the sealing surface and completely opens the flow region between the sealing element and the sealing surface, including the respective flow channel, i.e., the at least one flow channel.

When the downstream pressure chamber experiences a pressure drop that is greater than the lower limit value and less than the upper limit value, the sealing element lies against the sealing surface and partly opens the flow region (25) between the sealing element and the sealing surface exclusively by means of the respective flow channel.

According to an advantageous further development of the invention, the sealing element presses radially inward against a radially inward lying sealing surface of the valve body. This configuration is particularly preferred in order to implement the design of the invention.

According to an advantageous further development of the invention, the respective flow channel, i.e., the at least one flow channel, that interrupts the sealing surface at at least one circumferential position extends in the radial direction. This also serves to facilitate the implementation of the design of the invention.

Figure 2:
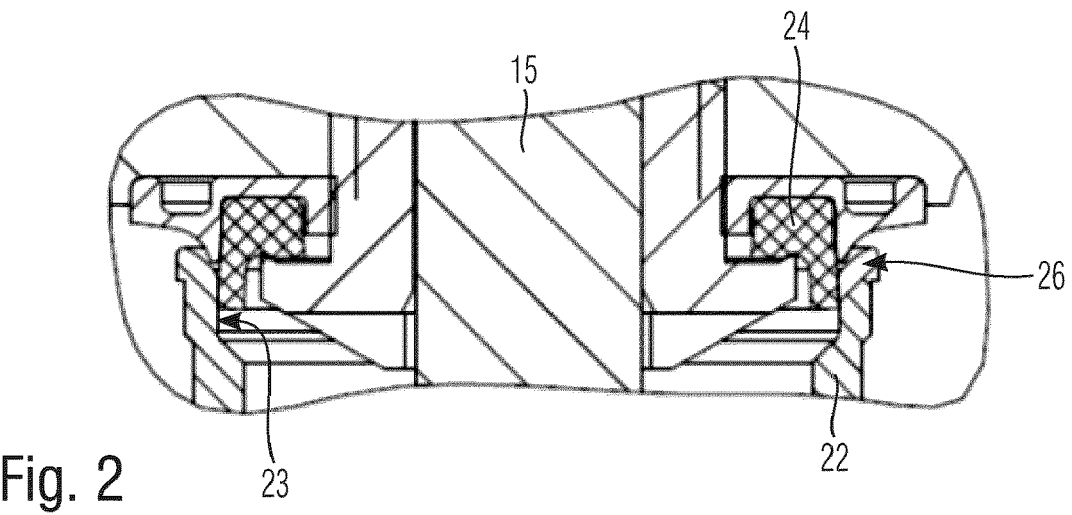
Figure 3:
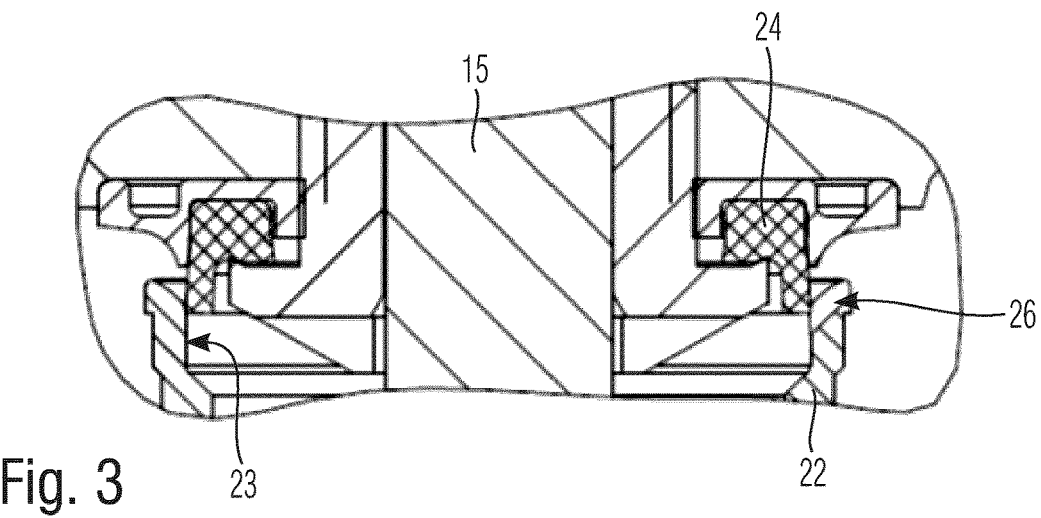
Figure 4:
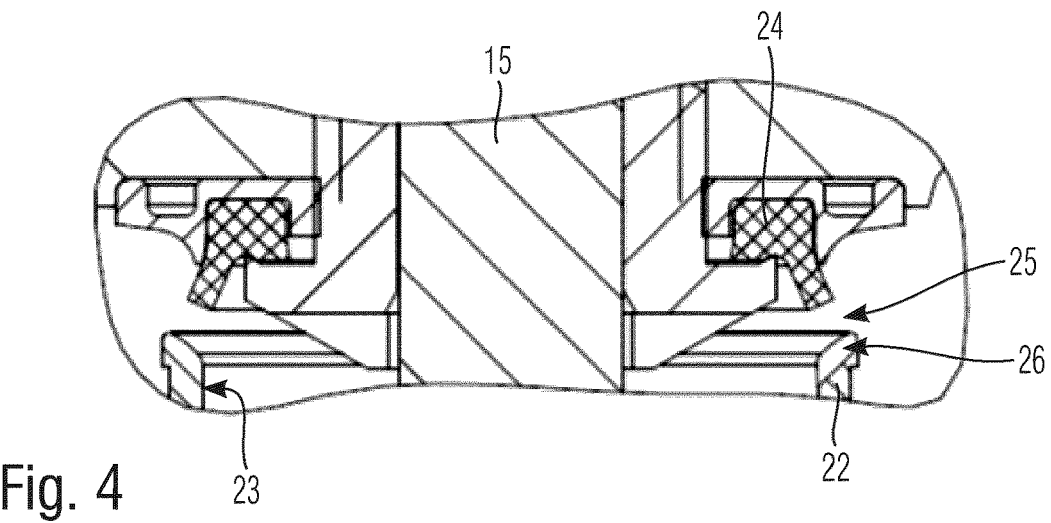
Figure 5:
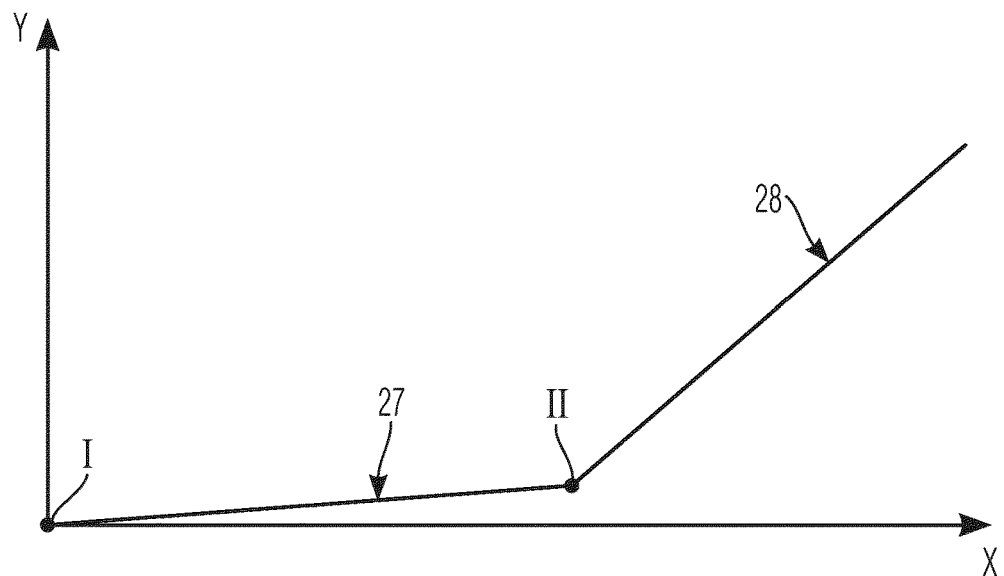
Figure 6:
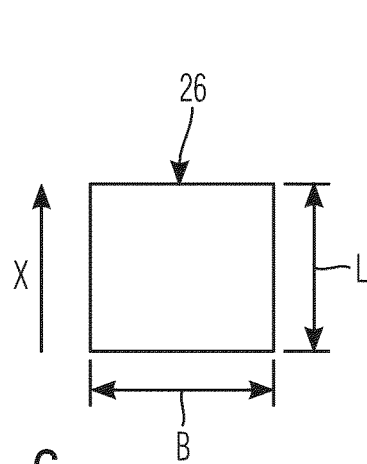
Figure 7:
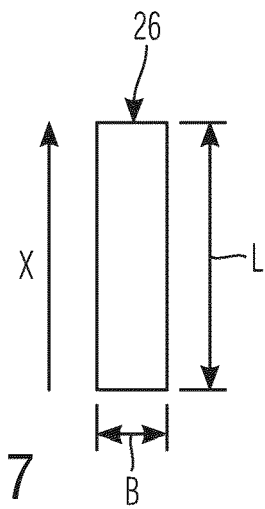
Figure 8:
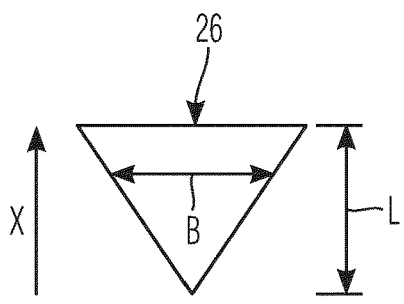
Figure 9:
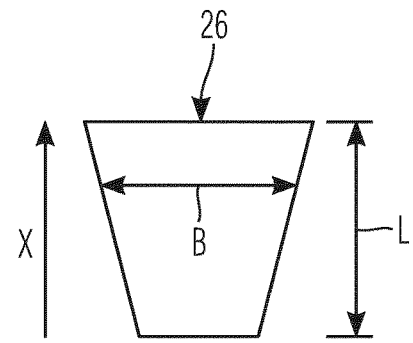

Preferred further developments of the invention arise from the sub-claims and the following description. An exemplary embodiment of the invention, without being limited thereto, is explained in greater detail below with reference to the drawing. The drawing shows:

FIG. 1 a cross-section through a pressure reducer according to the invention;

FIG. 2 the detail Z of FIG. 1 in a first state;

FIG. 3 the detail Z of FIG. 1 in a second state;

FIG. 4 the detail Z of FIG. 1 in a third state;

FIG. 5 a diagram to illustrate the invention;

FIG. 6 a first possible cross-sectional contouring of a flow channel of the pressure reducer;

FIG. 7 a second possible cross-sectional contouring of a flow channel of the pressure reducer;

FIG. 8 a third possible cross-sectional contouring of a flow channel of the pressure reducer; and FIG. 9 a fourth possible cross-sectional contouring of a flow channel of the pressure reducer.

FIG. 1 shows a cross-section through an exemplary embodiment of a pressure reducer 10 according to the invention. The pressure reducer 10 has a housing 11, wherein a valve 12 is positioned in the housing 11. In the closed state, the valve 12 separates an upstream pressure chamber 13 of the housing 11 from a downstream pressure chamber 14 of the housing 11, wherein the upstream pressure chamber 13 and the downstream pressure chamber 14 are connected in the open state of the valve 12.

The valve 12 of the pressure reducer 10 possesses a valve tappet 15 on which a diaphragm 16 acts. A spring force, which is provided by a spring element 17, acts on the diaphragm 16, wherein the spring element 17 is arranged between two spring seats 18, 19 according to FIG. 1. A first spring seat 18 faces the diaphragm 16. A second spring seat 19 faces away from the diaphragm 16. The first spring seat 18 and the diaphragm 16 are fastened to one another.

In addition to the spring force of the spring element 17, which acts in the opening direction of the valve 12, a force directed in the closing direction of the valve 12 of the pressure reducer 10 also acts on the diaphragm 16, wherein this force is dependent on a pressure prevailing in a pressure chamber 20 defined by the diaphragm 16.

This pressure prevailing in the pressure chamber 20, i.e., the force dependent on this pressure and acting in the closing direction of the valve 12 of the pressure reducer 10, is dependent on the pressure prevailing in the downstream pressure chamber 14. The pressure chamber 20 and the downstream pressure chamber 14 are connected by means of a pressure line 21.

Not only the diaphragm 16 but also a valve body 22 acts on the valve tappet 15. The valve body 22 comprises a sealing surface 23, which cooperates with a sealing element 24.

The sealing surface 23 of the valve body 22 fastened to the valve tappet 15 cooperates with the sealing element 24 in such a way that, in the closed state of the valve 12, the sealing element 24 lies sealingly against the sealing surface 23 and presses against the sealing surface 23 in the radial direction.

By contrast, in the open state of the valve 12, the sealing element 24 is removed from the sealing surface 23 and does not lie against it, wherein, in the open state of the valve 12, a flow region 25 between the sealing element 24 and the sealing surface 23 of the valve body 22 is opened.

In the sense of the present invention, the valve body 22 fastened to the valve tappet 15 has a cylindrical or hollow-cylindrical or conical contour, thus forming a sealing surface 23 that is effective in the radial direction.

In the exemplary embodiment shown, the valve body 22 is contoured as a hollow cylinder.

The sealing surface 23 effective in the radial direction is formed radially inward on the valve body 22, so that when the valve 12 is closed, the sealing element 24 presses radially inward against the radially inward lying sealing surface 23 of the valve body 22.

The sealing surface 23 of the valve body 22 fastened to the valve tappet 15 is interrupted at at least one circumferential position of the valve body 22 by means of a flow channel 26 in such a way that, depending on a pressure drop in the downstream pressure chamber 14, either the sealing element 24 lies against the sealing surface and presses against the sealing surface 23 when viewed in the radial direction and completely closes the flow region 25 between the sealing element 24 and the sealing surface 23, including the respective flow channel 26, or the sealing element 24 is removed from the sealing surface 23 and completely opens the flow region 25, including the respective flow channel 26, or the sealing element 24 lies against the sealing surface 23 and presses against the sealing surface 23 when viewed in the radial direction and partly opens the flow region 25 exclusively by means of the respective flow channel 26.

When the downstream pressure chamber 14 experiences no pressure drop or a pressure drop that is less than a lower limit value, the sealing element 24 lies with its full circumference against the sealing surface 23 and completely closes the flow region 25 between the sealing element 24 and the sealing surface 23, including the respective flow channel 26. This is shown in FIG. 2.

By contrast, as shown in FIG. 4, when the downstream pressure chamber 14 experiences a pressure drop that is greater than an upper limit value, the sealing element 24 is removed i.e., lifted from the sealing surface 23 of the valve body 22 and completely opens the flow region 25 between the sealing element 24 and the sealing surface 23, including the respective flow channel 26.

When the downstream pressure chamber 14 experiences a pressure drop that is greater than the lower limit value and less than the upper limit value, the sealing element 24 lies against the sealing surface 23 but partly opens the flow region between the sealing element 24 and the sealing surface 23, namely exclusively by means of the respective flow channel 26, which interrupts the sealing surface 23 at at least one circumferential position. This is shown in FIG. 3.

The valve 12 of the pressure reducer 10 assumes the state of FIG. 2 when there is no pressure drop in the downstream pressure chamber 14, i.e., when there is neither a regular fluid or water consumption nor a fluid or water leakage downstream of the downstream pressure chamber 14.

When there is a regular fluid or water consumption, the valve 12 of the pressure reducer 10 assumes the state of FIG. 4, and, through a movement of the valve body 22 fastened to the valve tappet 15 relative to the sealing element 24, the sealing element 24 is removed from the sealing surface 23 and thus completely opens the flow region 25.

By contrast, when there is no regular fluid or water consumption, but rather merely a leakage or a very small removal of fluid or water downstream of the downstream pressure chamber 14, the valve 12 of the pressure reducer 10 according to the invention assumes the state of FIG. 3. In this case, the sealing element 24 still lies against the sealing surface 23 of the valve body 22, but, through a relative movement between the valve body 22 and the sealing element 24, the sealing element 24 opens at least one flow channel 26, which interrupts the sealing surface 23 at a respective circumferential position. Should a leakage occur, a flow can take place via the flow channel 26, whereby a relatively large movement of the valve tappet 15 is caused compared to pressure reducers known from the prior art, which movement can be sensed and detected by means of a sensor (not shown) associated with the valve tappet 15.

It should be noted that, in the event of a leakage, by contrast to regular fluid or to water consumption, a leakage-induced fluid or water removal unintentionally occurs continuously, because fluid or water continuously escapes via a leakage point. The valve body 22 of the pressure reducer 10 adjusts itself to a corresponding position depending on the leakage, which compensates for the pressure drop in the downstream pressure chamber 14 caused by the leakage and causes a defined movement or a defined stroke of the valve tappet 15, which can be sensed and detected by means of a sensor (not shown) associated with the valve tappet 15.

FIG. 5 shows a diagram for further illustration of the invention. In FIG. 4, the opening movement or the opening stroke X of the valve tappet 15 is shown on the horizontal axis and a fluid or water removal from the downstream pressure chamber 14 is shown on the vertical axis Y.

When there is neither a regular fluid or water consumption nor a fluid or water leakage downstream of the downstream pressure chamber 14, i.e., when the valve 12 of the pressure reducer 10 assumes the state of FIG. 2, state I is present in the diagram of FIG. 5.

If there is no regular fluid or water consumption, but rather merely a leakage, and when the valve 12 of the pressure reducer 10 according to the invention assumes the state of FIG. 3, the opening movement or the opening stroke X of the valve tappet 15 follows the curved portion 27 of FIG. 5. A relatively small removal of fluid or water then causes a relatively large opening movement X of the valve tappet 15. This follows from the slope of the curved portion 27. This can be sensed and detected by means of the sensor associated with the valve tappet 15 (not shown).

When there is a regular fluid or water consumption, i.e., when the valve 12 of the pressure reducer 10 assumes the state of FIG. 4, the opening movement or the opening stroke X of the valve tappet 15 follows the curved portion 28 of FIG. 5. A relatively large fluid or water removal causes a relatively small opening movement X of the valve tappet 15. This follows from the slope of the curved portion 28.

In state II of FIG. 5, in which the curved portion 27 merges into the curved portion 28, the sealing element 24 begins to move away from the sealing surface 23 and begins to open the flow region 25 completely.

The at least one flow channel 26, which interrupts the sealing surface 23 of the valve body 22 fastened to the valve tappet 15 at at least one circumferential position can have any desired cross-sectional surface. FIGS. 6 to 9 show possible cross-sectional surfaces for the at least one flow channel 26.

In FIGS. 6 and 7, the cross-sectional surfaces for the at least one flow channel 26 are rectangularly contoured, respectively. Viewed along the opening movement X of the valve tappet 15 and thus of the valve body 22, a width B of the respective flow channel 26 is constant over its length L, resulting in the linear curved portion 27 shown in FIG. 5. The slope of the curved portion 27 becomes flatter as the length L of the cross-sectional surface of the at least one flow channel 26 becomes longer in relation to its width B, when viewed in the opening movement of the valve tappet 15.

FIGS. 8 and 9 show cross-sectional surfaces for the at least one flow channel 26 in which a width B of the respective flow channel 26 increases over its length L when viewed along the opening movement X of the valve tappet 15. The curved portion 27 then has a parabola-like profile.

In order to optimize a pressure drop across the valve body 22 upon reaching the state II of FIG. 5, it is advantageous for the cross-sectional surface of the at least one flow channel 26 to be contoured in such a way that, when viewed along the opening movement X of the valve tappet 15, the width B of the respective flow channel 26 increases. The cross-sectional contours according to FIGS. 8 and 9 for the at least one flow channel 26 are therefore preferred.

As can be seen from FIGS. 2, 3, and 4, the respective flow channel 26 interrupting the sealing surface 23 at a respective circumferential position extends in the radial direction and is preferably set at an angle relative to the axial direction.

By contrast to the exemplary embodiment shown, it is also possible for the sealing element 24 to lie against a radially outward sealing surface of the valve body 22. In this case, the sealing element 24 does not cooperate with the radially inward sealing surface 23, but rather with a radially outward sealing surface of the valve body 22 having a cylindrical or hollow-cylindrical or conical contour.

The invention makes it possible to reliably and easily detect a leakage that forms downstream of the pressure reducer 10. Even a relatively small leakage, which causes a relatively small pressure drop in the downstream pressure chamber 14 of the pressure reducer 10, causes a movement of the valve tappet 15 to an extent that can be safely and reliably detected.

LIST OF REFERENCE NUMERALS

10 Pressure reducer
11 Housing
12 Valve
13 Upstream pressure chamber
14 Downstream pressure chamber
15 Valve tappet
16 Diaphragm
to 17 Spring element
18 Spring seat
19 Spring seat
20 Pressure chamber
21 Pressure line
22 Valve body
23 Sealing surface
24 Sealing element
25 Flow region
26 Flow channel
27 Curved portion
28 Curved portion

What is claimed is:

1. A pressure reducer,
   comprising a housing, which defines an upstream pressure chamber and a downstream pressure chamber,
   with a valve positioned in the housing,
   wherein the valve in a closed state separates the upstream pressure chamber of the housing from the downstream pressure chamber of the housing and in an open state connects the upstream pressure chamber and the downstream pressure chamber,
   wherein the valve comprises a diaphragm acting on a valve tappet, on which diaphragm a spring force of a spring element directed in the opening direction of the valve acts on one side and a force dependent on a pressure in the downstream pressure chamber and directed in the closing direction of the valve acts on an opposite side, thus providing a pressure-reducing function, wherein the valve comprises a valve body, which is fastened to the valve tappet and which cooperates with a sealing element, wherein the valve body fastened to the valve tappet has a cylindrical or hollow-cylindrical or conical contour and thus forms a sealing surface effective in a radial direction, the sealing surface of the valve body fastened to the valve tappet is interrupted at at least one circumferential position by means of a flow channel in such a way that, depending on a pressure drop in the downstream pressure chamber, either the sealing element lies against the sealing surface and completely closes a flow region between the sealing element and the sealing surface, including the respective flow channel, or the sealing element is removed from the sealing surface and completely opens the flow region, including the respective flow channel, or the sealing element lies against the sealing surface and partly opens the flow region exclusively by means of the respective flow channel.

2. The pressure reducer according to claim 1, wherein when the downstream pressure chamber experiences no pressure drop or a pressure drop that is less than a lower limit value, the sealing element lies against the sealing surface and completely closes the flow region between the sealing element and the sealing surface, including the respective flow channel, when the downstream pressure chamber experiences a pressure drop that is greater than an upper limit value, the sealing element is removed from the sealing surface and completely opens the flow region between the sealing element and the sealing surface, including the respective flow channel, when the downstream pressure chamber experiences a pressure drop that is greater than the lower limit value and less than the upper limit value, the sealing element lies against the sealing surface and partly opens the flow region between the sealing element and the sealing surface exclusively by means of the respective flow channel.

3. The pressure reducer according to claim 2, wherein the sealing element presses radially inward against the sealing surface of the valve body.

4. The pressure reducer according to claim 2, wherein the sealing element presses radially outward against the sealing surface of the valve body.

5. The pressure reducer according to claim 2, wherein the at least one flow channel that interrupts the sealing surface at at least one circumferential position extends in the radial direction.

6. The pressure reducer according to claim 2, wherein when the downstream pressure chamber experiences no pressure drop, the sealing element lies against the sealing surface and completely closes the flow region between the sealing element and the sealing surface, including the respective flow channel, when the downstream pressure chamber experiences a first pressure drop, the sealing element is removed from the sealing surface and completely opens the flow region between the sealing element and the sealing surface, including the respective flow channel, when the downstream pressure chamber experiences a second pressure drop, the sealing element lies against the sealing surface and partly opens the flow region between the sealing element and the sealing surface exclusively by means of the respective flow channel.

7. The pressure reducer according to claim 2, wherein the valve tappet has an associated sensor, which detects movement of the valve tappet.

8. The pressure reducer according to claim 1, wherein the sealing element presses radially inward against the sealing surface of the valve body.

9. The pressure reducer according to claim 8, wherein the at least one flow channel that interrupts the sealing surface at at least one circumferential position extends in the radial direction.

10. The pressure reducer according to claim 8, wherein when the downstream pressure chamber experiences no pressure drop, the sealing element lies against the sealing surface and completely closes the flow region between the sealing element and the sealing surface, including the respective flow channel, when the downstream pressure chamber experiences a first pressure drop, the sealing element is removed from the sealing surface and completely opens the flow region between the sealing element and the sealing surface, including the respective flow channel, when the downstream pressure chamber experiences a second pressure drop, the sealing element lies against the sealing surface and partly opens the flow region between the sealing element and the sealing surface exclusively by means of the respective flow channel.

11. The pressure reducer according to claim 8, wherein the valve tappet has an associated sensor, which detects movement of the valve tappet.

12. The pressure reducer according to claim 1, wherein the sealing element presses radially outward against the sealing surface of the valve body.

13. The pressure reducer according to claim 12, wherein the at least one flow channel that interrupts the sealing surface at at least one circumferential position extends in the radial direction.

14. The pressure reducer according to claim 12, wherein when the downstream pressure chamber experiences no pressure drop, the sealing element lies against the sealing surface and completely closes the flow region between the sealing element and the sealing surface, including the respective flow channel, when the downstream pressure chamber experiences a first pressure drop, the sealing element is removed from the sealing surface and completely opens the flow region between the sealing element and the sealing surface, including the respective flow channel, when the downstream pressure chamber experiences a second pressure drop, the sealing element lies against the sealing surface and partly opens the flow region between the sealing element and the sealing surface exclusively by means of the respective flow channel.

15. The pressure reducer according to claim 12, wherein the valve tappet has an associated sensor, which detects movement of the valve tappet.

16. The pressure reducer according to claim 1, wherein the at least one flow channel that interrupts the sealing surface at at least one circumferential position extends in the radial direction.

17. The pressure reducer according to claim 16, wherein when the downstream pressure chamber experiences no pressure drop, the sealing element lies against the sealing surface and completely closes the flow region between the sealing element and the sealing surface, including the respective flow channel, when the downstream pressure chamber experiences a first pressure drop, the sealing element is removed from the sealing surface and completely opens the flow region between the sealing element and the sealing surface, including the respective flow channel, when the downstream pressure chamber experiences a second pressure drop, the sealing element lies against the sealing surface and partly opens the flow region between the sealing element and the sealing surface exclusively by means of the respective flow channel.

18. The pressure reducer according to claim 16, wherein the valve tappet has an associated sensor, which detects movement of the valve tappet.

19. The pressure reducer according to claim 1, wherein
when the downstream pressure chamber experiences no pressure drop, the sealing element lies against the sealing surface and completely closes the flow region between the sealing element and the sealing surface, including the respective flow channel, when the downstream pressure chamber experiences a first pressure drop, the sealing element is removed from the sealing surface and completely opens the flow region between the sealing element and the sealing surface, including the respective flow channel, when the downstream pressure chamber experiences a second pressure drop, the sealing element lies against the sealing surface and partly opens the flow region between the sealing element and the sealing surface exclusively by means of the respective flow channel.

20. The pressure reducer according to claim 1, wherein the valve tappet has an associated sensor, which detects movement of the valve tappet.

* * * * *